(12) United States Patent
Lalaoua (10) Patent No.: US 10,926,144 B2
(45) Date of Patent: Feb. 23, 2021

(54) MULTIMEDIA STADIUM SOCCER GOALPOST AND GOAL NET DISPLAY

(71) Applicant: Nabile Lalaoua, Las Vegas, NV (US)

(72) Inventor: Nabile Lalaoua, Las Vegas, NV (US)

( * ) Notice: Subject to any disclaimer, the term of this patent is extended or adjusted under 35 U.S.C. 154(b) by 148 days.

(21) Appl. No.: 16/262,660

(22) Filed: Jan. 30, 2019

(65) Prior Publication Data

US 2019/0160356 A1 May 30, 2019

Related U.S. Application Data

(63) Continuation-in-part of application No. 15/861,327, filed on Jan. 3, 2018, now Pat. No. 10,857,437.

(Continued)

(51) Int. Cl.
| | | |
|---|---|---|
| *A63B 63/00* | (2006.01) | |
| *A63B 71/06* | (2006.01) | |
| *G09F 23/00* | (2006.01) | |
| *G03B 21/58* | (2014.01) | |
| *G09F 27/00* | (2006.01) | |

(52) U.S. Cl.
CPC ........ *A63B 63/004* (2013.01); *A63B 71/0669* (2013.01); *G09F 23/0066* (2013.01); *A63B 2220/806* (2013.01); *A63B 2225/093* (2013.01); *A63B 2225/50* (2013.01); *A63B 2243/0025* (2013.01); *G03B 21/58* (2013.01); *G09F 27/00* (2013.01)

(58) Field of Classification Search
CPC ..... G09F 23/0066; G09F 27/00; G03B 21/58; A63B 63/004; A63B 71/0669; A63B 2220/806; A63B 2225/093; A63B 2225/50

USPC .......................................................... 473/478
See application file for complete search history.

(56) References Cited

U.S. PATENT DOCUMENTS

| | | | | |
|---|---|---|---|---|
| 5,273,292 A | * | 12/1993 | Pardi ................... | A63B 63/004 138/173 |
| 5,615,880 A | * | 4/1997 | Booth ................ | A63B 24/0021 273/371 |

(Continued)

FOREIGN PATENT DOCUMENTS

JP 2017244404 A * 12/2017

OTHER PUBLICATIONS

Isayama Translation, 2017, All Pages.*

*Primary Examiner* — John E Simms, Jr.
*Assistant Examiner* — Rayshun K Peng (57) ABSTRACT

A multimedia stadium soccer goalpost and goal net display. The system includes a rear support-and-multimedia assembly for supporting the net and producing audible and visual effects. The system also includes a stadium soccer goal frame and a net. The rear support-and-multimedia assembly includes at least two upright posts, a rear crossbar, and a multimedia bar system. The two upright posts and the rear crossbar delineate a U-shape and the multimedia bar system is mounted to said U-shape. The multimedia bar system includes a plurality of lights, a plurality of first speakers, a plurality of sponsor display panels, a retractably screen assembly, and a retractably underground projector in order to audible and visually convey content regarding the soccer game and advertisements to the audience. The system also includes a first corner camera, a second corner camera, and a multitude of rangefinder laser-detector video cameras to track, record, and present gameplay live.

18 Claims, 8 Drawing Sheets

Related U.S. Application Data

(60) Provisional application No. 62/498,586, filed on Jan. 3, 2017, provisional application No. 62/710,826, filed on Mar. 1, 2018.

(56) References Cited

U.S. PATENT DOCUMENTS

| | | | |
|---|---|---|---|
| 6,808,463 B1* | 10/2004 | Stockwell, III | A63B 63/004 473/476 |
| 2003/0181264 A1* | 9/2003 | Yoon | A63B 71/023 473/421 |
| 2004/0043844 A1* | 3/2004 | Hlavin | A63B 63/004 473/477 |
| 2008/0043157 A1* | 2/2008 | Jones | G09F 19/18 348/744 |
| 2008/0137038 A1* | 6/2008 | Winstanley | G03B 21/006 353/28 |
| 2014/0100062 A1* | 4/2014 | Terrell | A63B 71/0622 473/477 |
| 2017/0113113 A1* | 4/2017 | Cole | A63B 63/00 |

* cited by examiner

MULTIMEDIA STADIUM SOCCER GOALPOST AND GOAL NET DISPLAY

FIELD OF THE INVENTION

The present invention relates generally to sport field equipment and accessories. More specifically, the present invention is a stadium soccer goal and stadium soccer goal net display with a screen projector device, a safety prevention system integrated into the net, a mapping projection device, and an electronic scoring and advertising display. The present invention includes a hologram projector, a ball and player sensing system, and a multimedia display system. The present invention provides an alternative and novel means for viewing and enjoying a new scoring entertainment solution and advertising projection in professional soccer sporting events, specifically designed for soccer played in a stadium. The present invention is primary designed for the European professional football leagues and international football federations. Although, some of the features and technologies of the present invention may be implemented in a variety of professional sports including, but not limited to, soccer, handball, futsal, American football, rugby, lacrosse, and polo to name a few non-limiting examples.

BACKGROUND OF THE INVENTION

The present invention is a new generation soccer stadium goalpost and soccer goal net display. The present invention provides safety features and technologies to traditional soccer goalpost designed in the 1900s, while maintaining the official goalpost frame dimension as well maintaining the official mounting position in regard to the field and the goal line mark. The present invention offers new solutions and important improvements that includes a new safety prevention system and a new advertising display designed with todays technology in order to increase the quality of the game and the health of the players. The present invention is designed to be used in the International Football Federation Association (FIFA), the FIGA World Cup games, the Union European Football Association (UEF), and any members of the FIFA affiliated confederations for the FIFA confederations CUPs. Specifically, the present invention provides a novel means of integrating advertisement, logos, three-dimension projector devices, lights and siren systems, and screen projectors in and around the goal frame that completely with official rules of the sport. These features allow the audience and the players to experience the sport from a novel and new perspective. For example, the present invention includes a plurality of lights and light laser beams to visually indicate the current score of the game. Additionally, siren horns are also used to announce the official scoring goal. Furthermore, the present invention includes a variety of projectors and screens which visually display information and or advertisement to the audience and or players.

The present invention also provides the referees and the administrators of the game with useful information when a ball is in the vicinity of the goal frame. In particular, the present invention utilizes a multitude of sensing systems in order to track and determine if the ball truly passed the goal line of the goal frame. One of the sensing systems includes a multitude of cameras integrated into specific areas of the goal frame and directly behind the goal frame. Another sensing system includes a rangefinder laser video camera and a sensor integrated into the ball which allows the present invention to track the real time location of the ball. Thus, the present invention provides the referee and the administrators with empirical data that a goal was scored.

DETAIL DESCRIPTIONS OF THE INVENTION

All illustrations of the drawings are for the purpose of describing selected versions of the present invention and are not intended to limit the scope of the present invention.

The present invention generally relates to professional sports field equipment. In particular, the present invention is multimedia soccer stadium goal with a goal net display, an electronic scoring, advertising, and sensing system. Additionally, the present invention includes a flex safety net which prevents players from being injured during play. The present invention is a modern implementation of the traditional soccer goalpost that is designed to replace traditional net posts. Although, some of the features and technologies the present invention may be implemented together or separately for alternative sports including, but not limited to, rugby, handball, futsal, basketball, tennis, American football, baseball, Australian and Canadian football, cricket, water sports, snow sports, motor racing, horse racing, racetrack sports, ice hockey, Polo, field hockey, and other similar sports which utilize goal posts and a round and oval ball or object during game play.

Figure 1:
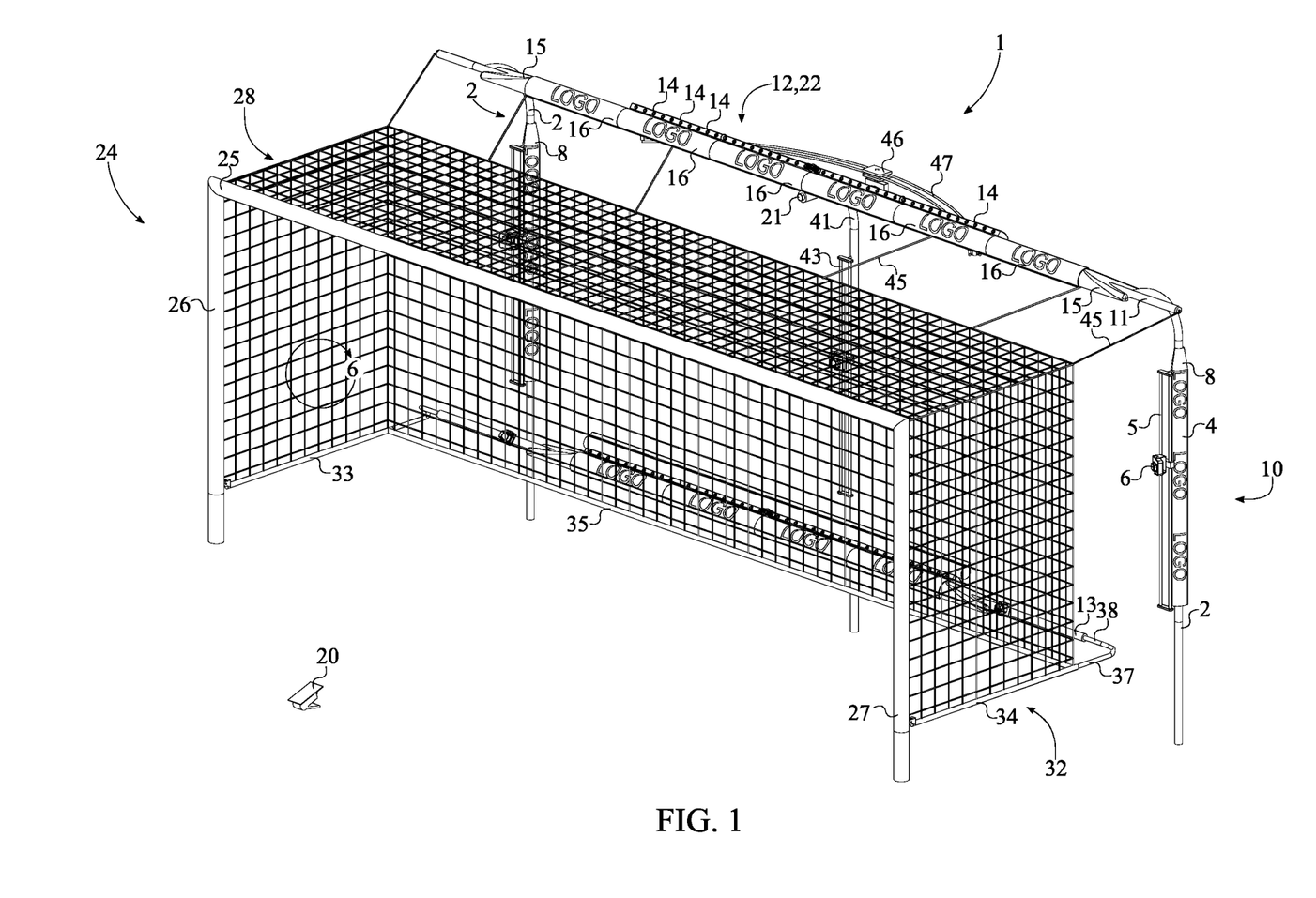
FIG. 1 is a perspective view of the present invention.

Referring to FIG. 1, in the simplest embodiment, the present invention comprises a rear support-and-multimedia assembly 1, a stadium soccer goal frame 24, a net 28, a soccer ball 29, and a net base frame 32. The rear support-and-multimedia assembly 1 provides audible and visual entertainment to the audience while simultaneously supporting the net 28 directly behind the stadium soccer goal frame 24. For this, the rear support-and-multimedia assembly 1 and the stadium soccer goal frame 24 are mounted offset to each other with the net 28 being tethered in between the stadium soccer goal frame 24 and the rear support-and-multimedia assembly 1. The rear support-and-multimedia assembly 1 comprises a first upright post 2, a second upright post 10, a rear crossbar 11, and an at least one multimedia bar system 12. The first upright post 2, the second upright post 10, and the rear crossbar 11 act as structural elements to support and uphold the multimedia bar system 12. Specifically, the first upright post 2 and the second upright post 10 are mounted parallel and offset to each other. The rear crossbar 11 supports the multimedia bar system 12 and a rear portion of the net 28. Thus, the rear crossbar 11 is positioned adjacent to a top end 49 of the first upright post 2 and a top end 49 of the second upright post 10. Additionally, the rear crossbar 11 is perpendicularly connected to the first upright post 2 and the second upright post 10 to mirror a traditional soccer goal frame. The multimedia bar system 12 provides audible and visual content to the audience and the referees/ administrative personnel regarding to the score, gameplay, player status, and advertisement of the game. The multimedia bar system 12 is positioned parallel to the rear crossbar 11 and is mounted offset to the stadium soccer goal frame 24. The multimedia bar system 12 can be used for all professional sports and by professional sport leagues including Olympic sport evens. Specifically, the multimedia bar system 12 is ideal for live sport evens that include television broadcasting. The multimedia bar system 12 may be mounted behind a field of play, specifically adjacent or offset to a goal line mark, a base line mark, an end zone mark, an end line mark, a finish line mark. Additionally, the multimedia bar system 12 may be mounted to any structure such as a wall, a billboard, a ceiling, or a ground surface to name a few non-limiting examples.

The overall design of the stadium soccer goal frame 24 is very similar to traditional goal posts. In particular, the stadium goal frame comprises a front crossbar 25, a first goal post 26, and a second goal post 27. The first goal post 26 is terminally and perpendicularly connected to the front crossbar 25. The second goal post 27 is positioned parallel and opposite to the first goal post 26, across the front crossbar 25. Similarly, the second goal post 27 is terminally and perpendicularly connected to the front crossbar 25. In one embodiment of the present invention, the stadium goal frame follows the traditional design. In particular, the first goal post 26 is connected to the front crossbar 25 by a first right square corner. Similarly, the second goal post 27 is connected to the front crossbar 25 by a second right square corner. In the preferred embodiment of the present invention, the stadium soccer goal frame 24 is designed with the curvature of the ball in mind. In particular, the first goal post 26 is connected to the front crossbar 25 by a first rounded corner. Similarly, the second goal post 27 is connected to the front crossbar 25 by a second rounded corner. This ensures that the stadium goal frame is designed to the curvature of the ball. In relation to the rear support-and-multimedia assembly 1, the front crossbar 25 is positioned parallel to the rear crossbar 11, across the net 28. The net 28 is a multitude of fabric segments woven together to form a mesh designed to catch the soccer ball 29 in order to prevent the soccer ball 29 from rolling away from the field or possibly hitting a bystander or any other personnel outside of the soccer game. The net 28 is perimetrically attached to the first goal post 26, the front crossbar 25, and the second goal post 27. A variety of means may be used to attach the net 28 to the stadium soccer goal frame 24 including, but not limited to, hooks, hook-and-loops fasteners, and a track-and-cable system.

Figure 2:
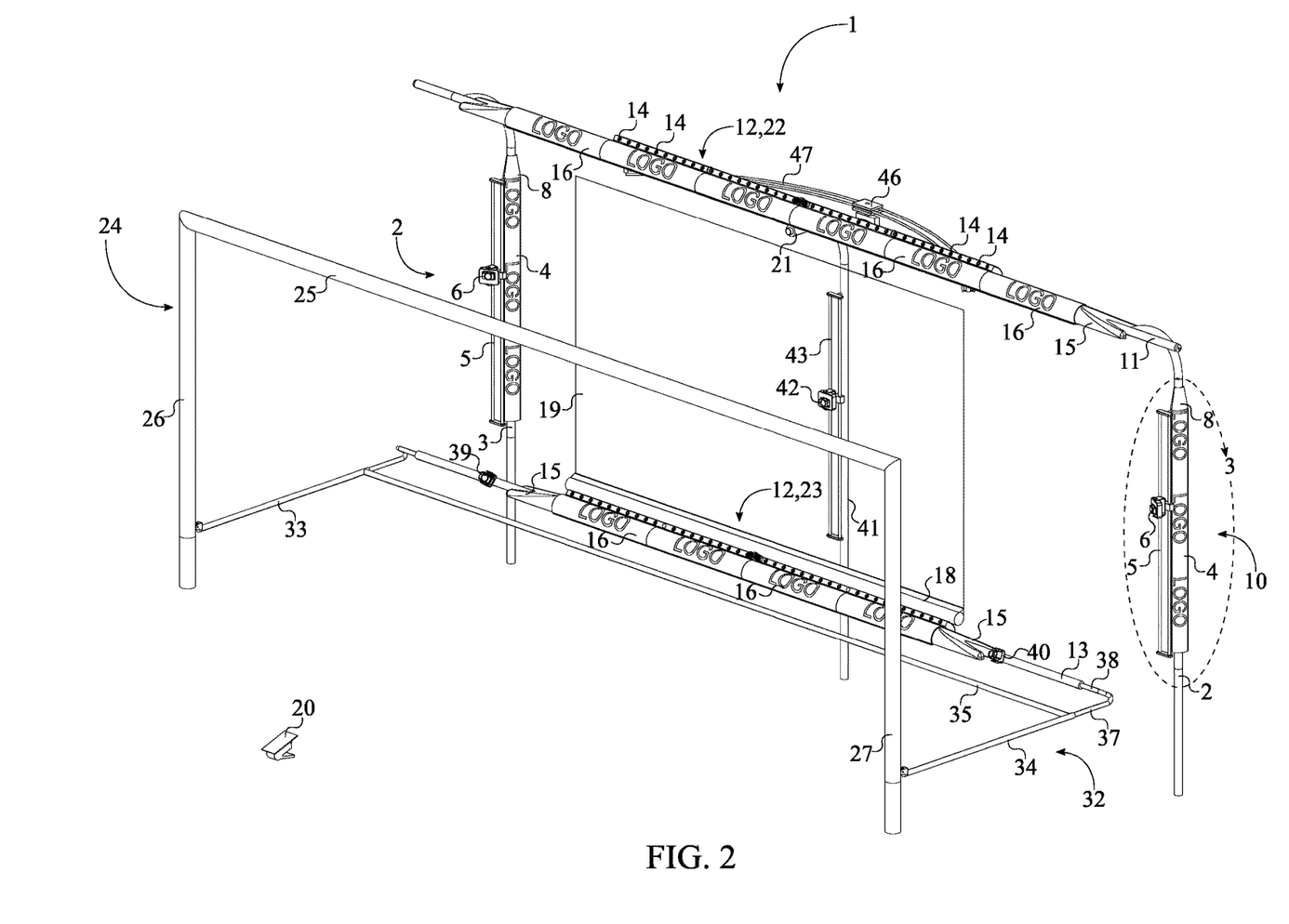
FIG. 2 is a perspective view of the present invention with the net being omitted.

The multimedia bar system 12 provides an alternative means of conveying the score of the game to the audience and the players of the game. In particular, the multimedia bar system 12 conveys the score of the game through an audible and visual medium. When a team scores a goal during the game, the present invention activates and produces an audible and visual representation. In order to ensure that the multimedia bar system 12 does not get damaged during game play, the multimedia bar system 12 is positioned behind the stadium goal frame as seen in FIG. 2. The multimedia bar system 12 comprises a plurality of lights 14, a plurality of first speakers 15, and a support bar 13. The support bar 13 structurally supports the plurality of lights 14 and the plurality of first speakers 15. The support bar 13 is oriented parallel to the rear crossbar 11 and mounted offset to the stadium soccer goal frame 24. The plurality of lights 14 provides the visual effect for the present invention and is distributed along the support bar 13; wherein each of the plurality of lights 14 is adjacently connected to the support bar 13. It is preferred that each of the plurality of lights 14 is a long row of powerful and waterproof stadium light emitting diodes (LEDs), protected by a grill guard mounted over the multimedia bar system 12, although alternative devices may also be utilized. The plurality of lights 14 may be used to depict the current score between opposing teams. Each time a goal is scored, a specific light from the plurality of lights 14 is turned on, wherein the specific light is associated with the corresponding scoring team. The plurality of first speakers 15 provides the audible effect for the present invention and is distributed along the support bar 13; wherein each of the plurality of first speakers 15 is adjacently connected to the support bar 13. It is preferred that each of the plurality of first speakers 15 is a powerful and waterproof siren. The plurality of first speakers 15 may be used for a variety of purposes including, but not limited to, score announcement, advertisement audio, music, and other similar purposes. It is preferred that each of the plurality of first speakers 15 and each of the plurality of lights 14 are oriented towards the stadium soccer goal frame 24 and the center of the field for maximum visibility, although alternative orientation may also be utilized.

In one embodiment of the present invention, the multimedia bar system 12 further comprises a plurality of sponsor display panels 16. The plurality of sponsor display panels 16 provides an additional medium through which advertisement and other similar content may be displayed to the audience. The plurality of sponsor display panels 16 is distributed along the support bar 13 with each of the plurality of sponsor display panels 16 being adjacently connected to the support bar 13. Each of the plurality of sponsor display panels 16 may be an electronic display device or a banner/sticker with advertisement content. The multimedia bar system 12 and other electronic components of the present invention may be directly connected to a power outlet, a battery source, a power generator, or other similar sources.

Figure 4:
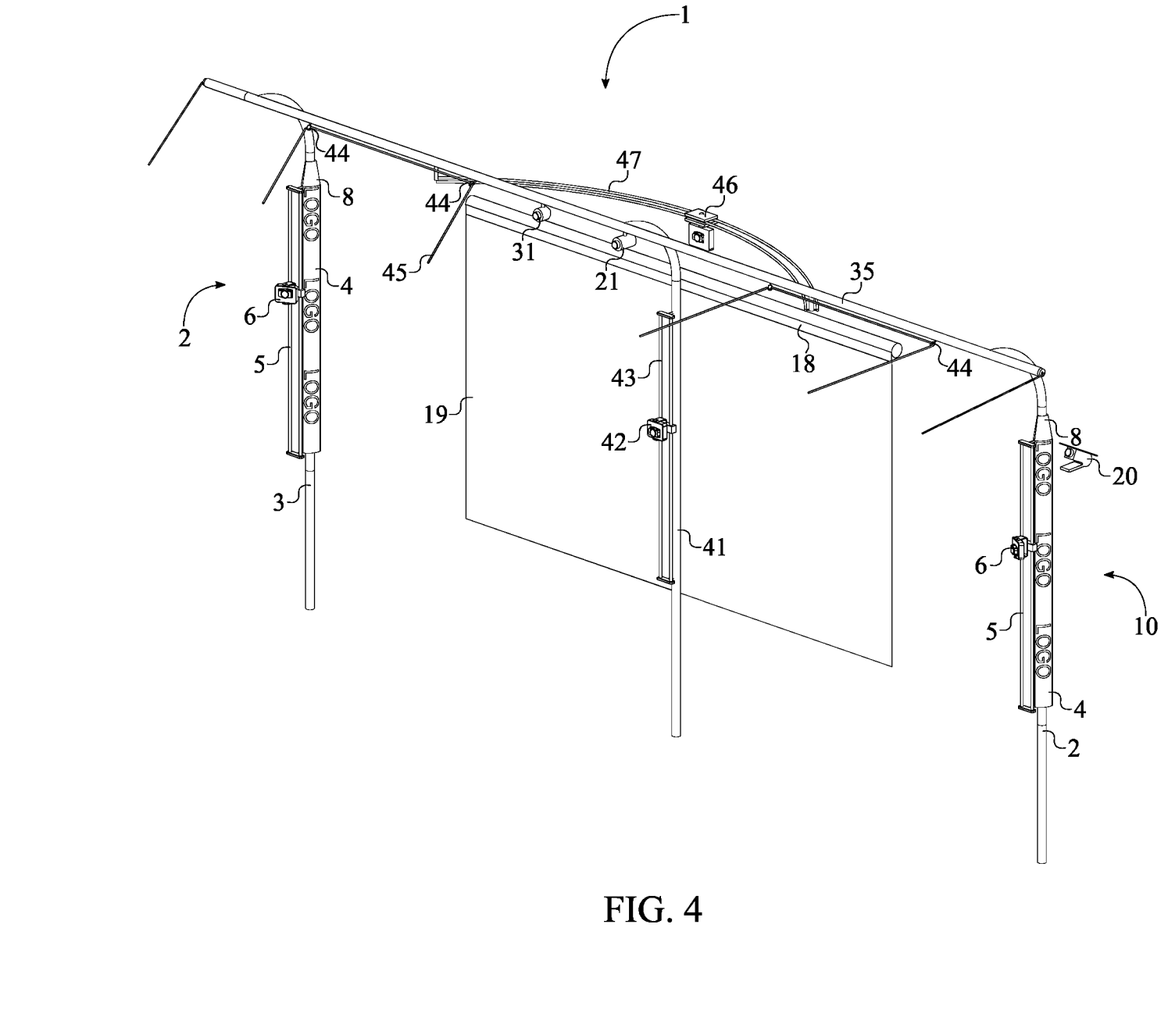
FIG. 4 is perspective view of a partial depiction of the rear support-and-multimedia assembly of the present invention.

Referring to FIG. 2 and FIG. 4, in yet another embodiment of the present invention, the multimedia bar system 12 further comprises a retractably screen assembly 17 and an at least one retractable underground projector 20. The retractable screen assembly 17 provides a medium upon which graphical content may be displayed. The retractably screen assembly 17 comprises a motorized housing 18 and a screen 19. The screen 19 is a think sheet of material designed to reflect projected images. In one embodiment, the screen 19 may be semi-transparent; in another embodiment, the screen 19 is not transparent. The motorized housing 18 stores the screen 19 when not in use in a rolled-up configuration. The retractable screen assembly 17 is positioned in between the first upright post 2 and the second upright post 10, thus providing audience behind and in front of the stadium soccer goal frame 24 with a view of the content being displayed by the retractable underground projector 20. To support the retractable screen assembly 17, the motorized housing 18 is mounted parallel to the support bar 13 with the screen 19 being mechanically integrated into the motorized housing 18. Resultantly, when the screen 19 is positioned in the extended configuration, the screen 19 extends into the space in between the first upright post 2 and the second upright post 10. The retractable underground projector 20 is an image projector which displays images, logo's, advertisement, and gameplay onto the screen 19. Specifically, the retractable underground projector 20 is mounted offset to the stadium soccer goal frame 24 and is oriented towards the screen 19. A variety of devices may be used as the retractable underground projector 20. The preferred device is a pop-up projector that is integrated into the ground either behind the rear support-and-multimedia assembly 1 or in front of the stadium soccer goal frame 24. The retractable underground projector 20 is positioned underground until activated. When activated, the retractable underground projector 20 raises above ground and displays content onto the screen 19. This configuration ensures that no components of the present invention interfere with gameplay or the players within the game. The size of the screen 19, the material composition of the screen 19, and the type of device used as the retractable underground projector 20 is subject to change to meet the needs and preferences of the user.

In one embodiment of the present invention, the screen 19 is an LED screen, wherein the screen 19 is a flat screen device with an array of LEDs that are selectively activated to display various content such as numbering, video reply, advertising video, images such as company and sponsor logo information, text, various messages, and other similar visual content. The LED screen may rise above the rear crossbar 11 to display content above the present invention. The length, size, and LED concentration is subject to change to meet the needs and preferences of the user.

In another embodiment of the present invention, the screen 19 is a display device such as a television or other similar technology. In this embodiment, the screen is mounted in between the first upright post 2 and the second upright post 10 and may or may not be retractable.

In the preferred embodiment of the present invention, the multimedia bar system 12 further comprises an at least one pivoting projector device 21. The pivoting projector device 21 displays content about and around the present invention. The pivoting projector device 21 is centrally and externally mounted to the rear crossbar 11. Additionally, the pivoting projector device 21 may be protected by a guard cover. The pivoting projector device 21 may be oriented towards the ground and projects a three-dimensional imaging. Alternatively, the pivoting projector device 21 may display content directly above the present invention. In general, the pivoting projector device 21 is capable of rotating and tilting in order to display a three-dimension hologram anywhere around the present invention. The pivoting projector device 21 may be oriented towards the sky, above the field, and above the stadium soccer goal frame 24, in particular towards the top center of the sport stadium field to project large and very large three-dimensional images mid-air to be seen from any angle and from under or above the present invention during live sport events. This is not limited to professional sports events and discipline from all types of professional sports, including water sports and no water sports. Type of content that the pivoting projector device 21 may display includes, but is not limited to, replay of the most recent goal, three dimensional images of sports team and player t-shirt, jersey or sports team logo associated with the most recent scored goal, advertisements, and other similar content. A hologram programmer or other administrative staff is in charge of content being displayed by the pivoting projector device 21. More specifically, a staff member of each professional sport club is in charge to manage both team's Jersey/T-shirts and ready for projection when a goal is scored.

In one embodiment of the present invention, the pivoting projector device 21 is a long zoom projector. The long zoom projector is a projecting device with a long-range zoom lens capable of projecting images, videos, texts messages, and three-dimensional holograms across the field to an opposing goal post. For this, the opposing goal post may also include a transparent screen 19 for receiving the images from the long zoom projector. The long zoom projector displays content onto and or above the opposing goal post such as official scoring announcements, advertising, products, sponsor logo, country flags, team logos, time, scoring, announcement of change of player, and video advertising to name a few non-limiting examples.

In one embodiment of the present invention, the pivoting projector device 21 is a mapping projector device. the mapping projector device utilizes specialized projection technology to turn any surface into a dynamic display. For the present invention, the mapping projector device may be mounted anywhere within the stadium and field of play and may be oriented towards any surface. For example, in one embodiment, the mapping projector device is suspended on a cable system above the field of play and is oriented towards the ground such that content may be displayed directly on the field of play for the audience to see. A similar effect may be achieved by mounting the mapping projector device to a drone that flies anywhere within the stadium. In one embodiment of the present invention, the pivoting projector device 21 is a laser beam projector.

In the preferred embodiment the present invention further comprises a net base frame 32. The net base frame 32 secures a bottom portion of the net 28 close to the ground to prevent the ball from escaping from the net. The net base frame 32 is a U-shaped structure that is hingedly attached to the soccer stadium goal frame for storage purposes. The net base frame 32 comprises a first ground tubular bar 33, a second ground tubular bar 34, and a first connecting bar 35. To support the net, the net base frame 32 is positioned in between the stadium soccer goal frame 24 and the rear support-and-multimedia assembly 1. Specifically, the first ground tubular bar 33 and the second ground tubular bar 34 are positioned parallel and offset to each other, across the front crossbar 25. The first ground tubular bar 33 is terminally and hingedly connected to the first goal post 26, opposite the front crossbar 25; thus, positioning the net base frame 32 on the ground. Similarly, the second ground tubular bar 34 is terminally and hingedly connected to the second goal post 27, opposite the front crossbar 25. This allows the net base frame 32 to be raised towards the stadium soccer goal frame 24 for storage, transportation, and maintenance. The first connecting bar 35 connects the first ground tubular bar 33 and the second ground tubular bar 34. Specifically, the connecting bar is perpendicularly connected in between the first ground tubular bar 33 and the second ground tubular bar 34. The net 28 is perimetrically attached to the first ground tubular bar 33, the second ground tubular bar 34, and the first connecting bar 35. The net 28 is attached to the net base frame 32 through a cable and track system. For this, the present invention further comprises a first track and a first cable. The first track is connected along the first ground tubular bar 33, the second ground tubular bar 34, and the first connecting bar 35. Complimentary, the first cable is perimetrically connected along the bottom portion of the net 28. To attach the net, the first cable is slidably engaged within the first track. This allows for easy installment, removal, and maintenance.

Figure 3:
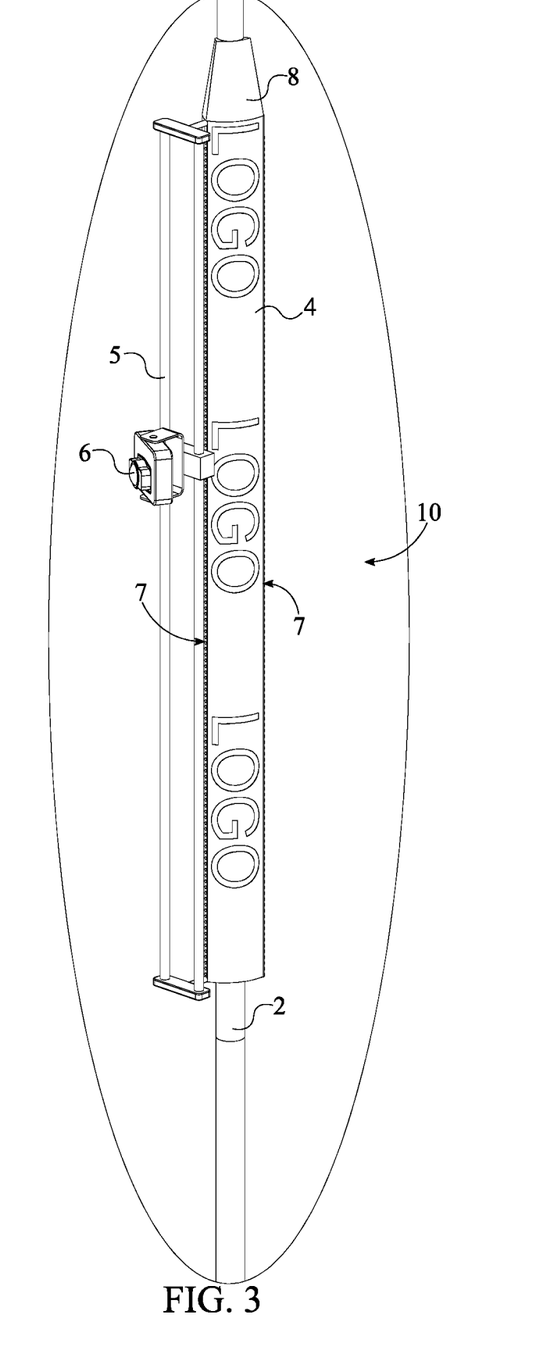
FIG. 3 is a detailed view of the second upright post from the present invention taken about the oval 3-3 in FIG. 2.
Figure 5:
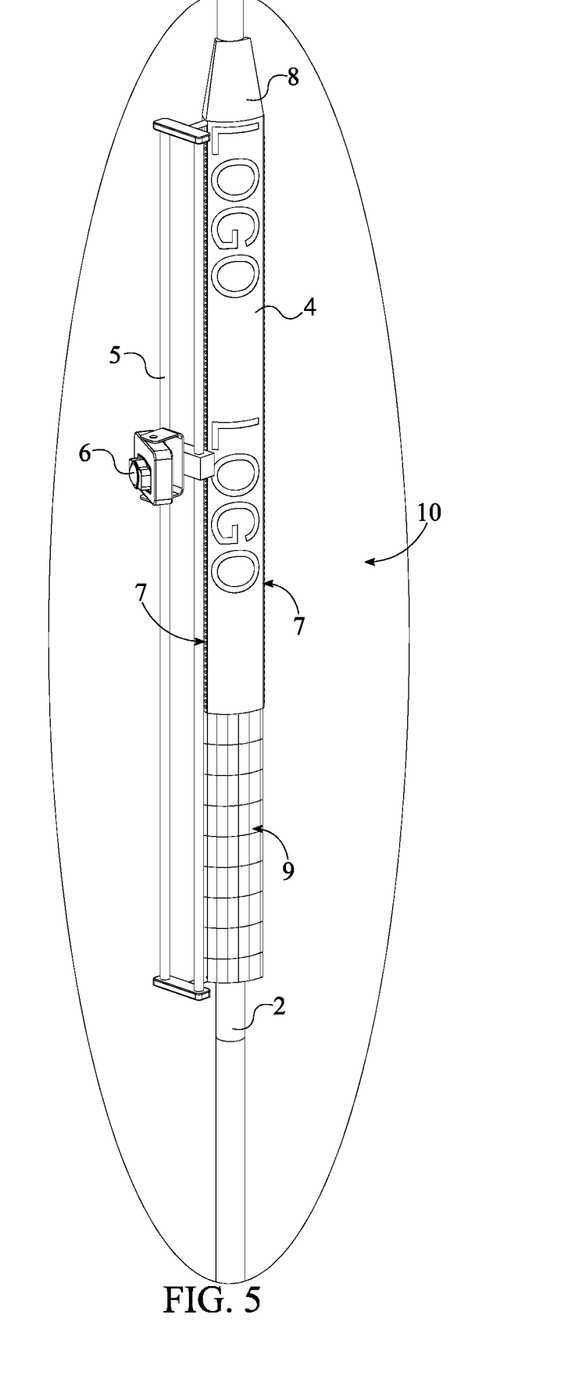
FIG. 5 is a detailed view of an alternative embodiment of the second upright post, taken about the oval 3-3 in FIG. 2.

Referring to FIG. 4 and FIG. 5, the first upright post 2 and the second upright post 10 provide additional advertisement and content exposure. Specifically, the first upright post 2 and the second upright post 10 each comprise a tubular body 3, a plurality of advertisement panels 4, a first camera track 5, a first rangefinder laser-detector video camera 6, a plurality of light-emitting diode (LED) strips 7, an at least one second speaker 8, and a solar platform base 9. The tubular body 3 acts as the structural core and, in the preferred embodiment, is a goose neck structure. The goose neck structure allows for the first upright post 2 and the second upright post 10 to be mounted further offset from the stadium soccer goal frame 24 for further preventing players from accidentally hitting either the first upright post 2 or the second upright post 10. Additionally, it is preferred that the tubular body 3 is telescopic to allow for the overall height of the first upright post 2 and the second upright post 10 to be changed. The plurality of advertisement panels 4 positions advertisement content about and along the tubular body 3. Each of the plurality of advertisement panels 4 is an elongated planar structure that is partially curved with content displayed or positioned on an external surface as seen in FIG. 3. In one embodiment, each of the plurality of advertisement panels 4 is an electronic display device. In another embodiment, each of the plurality of advertisement panels 4 is a planar structure with painted, drawn on, or stickered content on the external surface. The plurality of advertisement panels 4 is radially distributed about the tubular body 3, adjacent to a bottom end of the tubular body 3; wherein each of the plurality of advertisement panels 4 is adjacently mounted along the tubular body 3. It is preferred that the number within the plurality of advertisement panels 4 is three. The resulting overall shape of the plurality of advertisement panels 4 is a prism with a triangular cross-section. As such, all sides about the tubular body 3 are covered with advertisement. In one embodiment, the first upright post 2 and the second upright post 10 may each be implemented with a single advertisement panel. The plurality of LED strips 7 provides additional visual content for the audience. Each of the plurality of LED strips 7 is a multitude of LEDs arranged in a linear configuration. The plurality of LED strips 7 is radially distributed about the tubular body 3 with each of the plurality of LED strips 7 being mounted along the tubular body 3. It is preferred that the plurality of LED strips 7 is interspersed amongst the plurality of advertisement panels 4.

The second speaker 8 provides audible content directly from the tubular body 3. It is preferred that the second speaker 8 is a powerful and waterproof siren. The second speaker 8 is terminally positioned to the plurality of advertisement panels 4 and is mounted about the tubular body 3. In one embodiment, the second speaker 8 is terminally positioned to the plurality of advertisement panels 4, adjacent to rear crossbar 11. In another embodiment, the second speaker 8 is positioned adjacent to the ground on the tubular body 3. In yet another embodiment, the at least one second speaker 8 comprises a primary second speaker 8 and a secondary second speaker 8; wherein the primary second speaker and the secondary second speaker are mounted opposite to each other across the plurality of advertisement panels 4. The first rangefinder laser-detector video camera 6 and the first camera track 5 capture gameplay from a variety of angles along the tubular body 3. The first camera track 5 is an elongated rod(s) that provides the first rangefinder laser-detector video camera 6 a means of translating along the tubular body 3 for a variety of footage angles. Specifically, the first camera track 5 is positioned parallel and offset to the tubular body 3. Additionally, the first camera track 5 is mounted along the tubular body 3. The first rangefinder laser-detector video camera 6 is slidably mounted to and along the first camera track 5. This allows the first rangefinder laser-detector video camera 6 to capture gameplay from a variety of heights. Additionally, it is preferred that the first rangefinder laser-detector video camera 6 is pivotably mounted to the first camera track 5 to allow for the first rangefinder laser-detector video camera 6 to pivot to track the soccer ball 29. For this, the first rangefinder laser-detector video camera 6 is oriented towards the stadium soccer goal frame 24. In another embodiment of the present invention, the first upright post 2 and the second upright post 10 each further comprise a solar platform base 9, seen in FIG. 5. The solar platform base 9 powers the various electronic components of the present invention. The solar platform base 9 is positioned opposite the second speaker 8, across the plurality of advertisement panels 4. Additionally, the solar platform base 9 is mounted about the tubular body 3.

In another embodiment, the rear support-and-multimedia assembly 1 further comprises a central support post 41, a second rangefinder laser-detector video camera 42, and a second camera track 43. The aforementioned components provide additional stability to the rear support-and-multimedia assembly 1 as well as additional media coverage. Specifically, the central support post 41 is positioned parallel and in between the first upright post 2 and the second upright post 10. Similar to the tubular body 3 of the first upright post 2 and the tubular body 3 of the second upright post 10, the central support post 41 is preferably telescopic to allow for height variation of the overall rear support-and-multimedia assembly 1. The second camera track 43 provides the second rangefinder laser-detector video camera 42 a means of height adjustment. Specifically, the second camera track 43 is mounted adjacent and along the central support post 41. Additionally, the second rangefinder laser-detector video camera 42 is slidably mounted along the second camera track 43, thus allowing the second rangefinder laser-detector video camera 42 to raise or lower relative to the ground. To capture gameplay, the second rangefinder laser-detector video camera 42 is oriented towards the stadium soccer goal frame 24.

Figure 8:
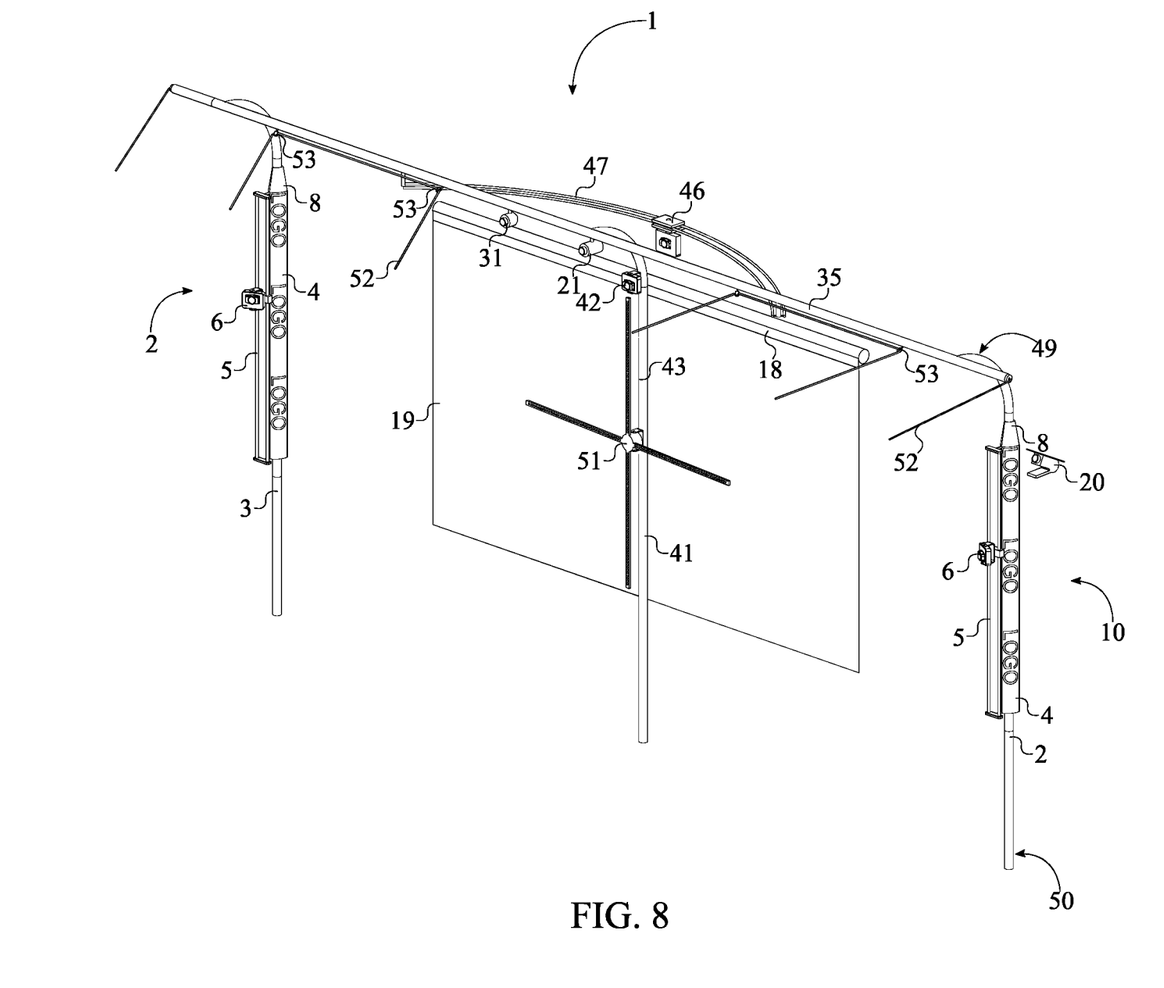
FIG. 8 is perspective view of a partial depiction of the rear support-and-multimedia assembly of an alternative embodiment of the present invention.

In another embodiment, the second rangefinder laser-detector video camera 42 is replaced with an at least one three-dimensional LED fan projector 51. The three-dimensional LED fan projector 51 comprises a rotating central base, a plurality of LED rails, and a plurality of blades. The rotating central base houses the electronic components needed to power and control the plurality of LED rails. The plurality of blades support and rotate the plurality of LED rails in order to create hologram images. Specifically, the plurality of plurality of blades is radially distributed about the rotating central base with each of the plurality of blades being terminally connected to the rotating central base. Each of the plurality of LED rails include a linear set of LED lights for producing visual effects. Each of the plurality of LED rails is connected adjacent and along a corresponding blade from the plurality of blades as seen in FIG. 8. Resultantly, the plurality of blades and the plurality of LED rails are capable of spinning with the rotating central base. At high rotations per minute, the plurality of LED rails can be activated to produce images with the plurality of blades being essentially invisible, thus creating a hologram effect. In reference to the central support post 41, the three-dimensional LED fan projector 51 is positioned in between the net 28 and the central support post 41. Additionally, the three-dimensional LED fan projector 51 is mounted to the central support post 41.

In another embodiment of the present invention, the screen 19 is centrally mounted to the central support post 41. In this embodiment of the present invention, the screen 19 is transparent and is mounted in between the first upright post 2, the second upright post 10, the rear crossbar 11, and the ground.

In another embodiment, the present invention further comprises a panoramic camera 46 and a third camera track 47. The panoramic camera 46 and the third camera track 47 provide gameplay coverage from a variety of angles ranging from the first upright post 2 to the second upright post 10. Specifically, the third camera track 47 is centrally positioned to the rear crossbar 11. Additionally, the third camera track 47 is mounted adjacent and along the rear crossbar 11. The panoramic camera 46 is slidably mounted along the third camera track 47. Furthermore, the panoramic camera 46 is oriented towards the stadium soccer goal frame 24. This allows the panoramic camera 46 to horizontally translate along the rear crossbar 11 from the first upright post 2 towards the second upright post 10 to obtain a variety of angles of the gameplay. The panoramic camera 46 is electronically connected to the multimedia bar system 12 to allow for data captured by the panoramic camera 46 to be streamed through the multimedia bar system 12 as well as synced up with the audible and visual effects of the multimedia bar system 12.

Figure 6:
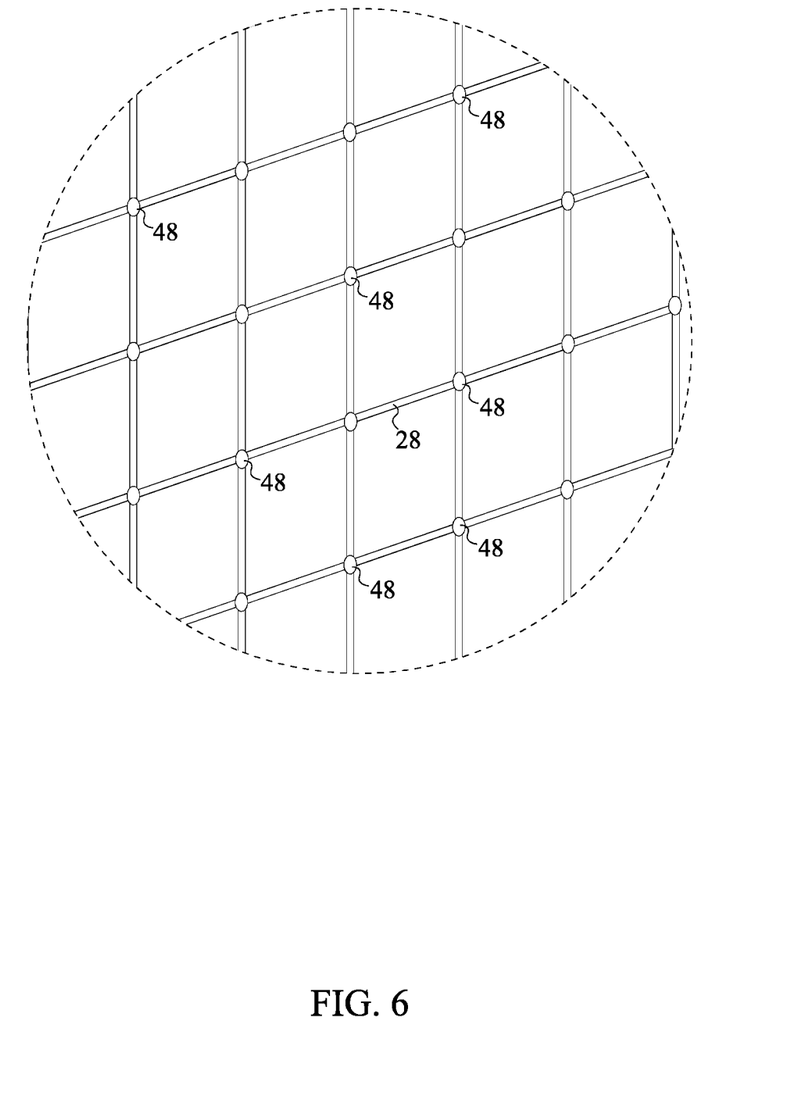
FIG. 6 is a detailed view of the net taken about circle 6-6 in FIG. 1 depicting an alternative embodiment of the present invention.

Referring to FIG. 6, the net 28 is additionally designed to provide the audience with visual entertainment. For this, the present invention further comprises a plurality of programmable LEDs 48. The plurality of programmable LEDs 48 is distributed about the net 28 to light up the net in a variety of colors and pattern schemes. Specifically, each of the plurality of programmable LEDs 48 is waterproof for outdoor and indoor stadiums and is mechanically integrated into the net and are synced up with the multimedia bar system 12. When lit up, the plurality of programmable LEDs 48 may be used to display colors of the scoring team, different emblems and logos, or any other preset visual effects. Additionally, the plurality of programmable LEDs 48 may be used for goal announcement and can be seen from any direction and angle in the stadium. The net 28 may be used to produce scrolling text, messaging, logos, and signages controlled by an external computing device; additionally, the plurality of programmable LEDs 48 may be implemented in a variety of colors and oriented towards the stadium and the field. Furthermore, each of the plurality of programmable LEDs 48 may use technology such as neon light and animation light rays. The plurality of programmable LEDs 48 may be integrated into any type of mesh profile including square mesh, hexagonal mesh, knotted mesh, and any net profiles. This technology may be integrated into any type of sport that uses a net including, but not limited to, handball, futsal, ice and field hockey, basketball, tennis, volley ball, beach volley ball, and lacrosse. Essentially, this technology can be integrated into any sport which uses a fencing or any netting around the field.

The present invention provides a novel means of raising and supporting the net 28 that prevents players from injuring themselves after accidentally running into and getting caught up in the net 28. The plurality of cable loops acts as the engagement point for net 28 and is distributed about the net 28, adjacent to the rear support-and-multimedia assembly 1. In general, each of the plurality of cable loops is adjacently connected to the net. Each of the plurality of cable loops is an elongated cable with a free end being looped and a fixed end being adjacently connected to the net 28. The plurality cable pulleys and the elastic cord(s) 45 elastically couple the rear crossbar 11 to the plurality of cable loops. Specifically, the plurality of cable pulleys 44 is distributed along the rear crossbar 11 with each of the plurality cable pulleys being adjacently and rotatably mounted to the rear crossbar 11. The elastic cord 45 is an elongated rope that is tethered in between the plurality of cable pulleys 44 and the plurality of cable loops in a taught state. Resultantly, the elastic cord 45 keeps the net up and anytime any force is applied to the net 28, a player running into the net for example, the elastic cord 45 stretches to slow the player down and then retracts to raise the player. This reduces the impact force felt by the player and, thus, reduces chances of injury to said player. In the preferred embodiment of the present invention, the at least one elastic cord 45 includes six cords. It is also preferred that the outer edges of the net 28, the portions of the net 28 outlining the box-like shape of the net 28, be reinforced with strong wire cables for additional structural support. To ensure maximum safety coverage for this feature, it is preferred that the first upright post 2 and the second upright post 10 are mounted within a limited distance laterally offset from the stadium soccer goal frame 24 in order to offer full clearance along the side of the net 28 for maximum safety prevention.

In another embodiment of the present invention, referring to FIG. 8, the present invention raises and supports the rear portion of the net 28 with an at least one retracting reel cord 52 and a plurality of retracting reel cord housings 53. The plurality of retracting reel cord housings 53 is distributed along the rear crossbar 11 and apply a force on the retracting reel cord in order to support the net 28. Specifically, each of the plurality of retracting reel cord housings 53 is adjacently and rotatably mounted to the rear crossbar 11. This ensures that regardless of which direction the net 28 is pulled, the plurality of retracting reel cord housings 53 will apply the appropriate force to return the net 28 to a standard configuration. The plurality of retracting reel cord housings 53 is connected to the net 28 by the retracting reel cord 52. Specifically, the retracting reel cord 52 is tether in between the plurality of retracting reel cord housing 53 and the net 28.

The present invention also comprises a sensing system for tracking the soccer ball 29 and ensuring the validity of a goal. The sensing system comprises an electromagnetic shielding bar and a specially design for the soccer ball 29. Additionally, the multimedia bar system 12 further comprises a laser rangefinder 31. The electromagnetic shielding bar acts as a sensor in order to identify if and or when the soccer ball 29 passes the goal line. For this, the electromagnetic shielding bar is positioned in between the soccer stadium goal frame and the rear support-and-multimedia assembly 1, and is oriented parallel to the front crossbar 25. Additionally, the electromagnetic shielding bar is mounted to the net 28, adjacent and offset to the front crossbar 25. In particular, the electromagnetic shielding bar is positioned behind the front crossbar 25 between the top section of the net 28 and the top edge on the front crossbar 25 with a thickness of maximum five centimeters to meet standard regulations (Professional Ball size 5) with the soccer ball 29 circumference to be 68 centimeters to 70 centimeters. The soccer ball 29 is composed of magnetized threading and electromagnetic-field-shielding fabric, or Señor stitching treads, and is thus communicably coupled to the electromagnetic shielding bar. To accurately sense the soccer ball 29 passing the goal line fully, a requirement for a goal in soccer, the electromagnetic shielding bar is positioned a first distance from the front crossbar 25. For major league soccer embodiment of the present invention, the first distance is equal to the width of a full-size soccer ball 29, which is between 21.6 centimeters and 23 centimeters; this is the official size, wherein the circumference is between 27 and 28 inches (69 to 71 centimeters). As a result, when the soccer ball 29 passes the electromagnetic shielding bar, the magnetic field set up by the electromagnetic shielding bar will be triggered. This registers with an external computing device, indicating that the soccer ball 29 has fully passed the goal line. In one embodiment of the present invention the at least one electromagnetic shielding bar may comprise a pair of shielding bars. The pair of shielding bars are positioned parallel and offset to each other across the stadium soccer goal frame 24. In one embodiment, the pair of shielding bars is positioned adjacent and parallel to the first goal post 26 and the second goal post 27. In another embodiment of the present invention, the pair of shielding bars are positioned parallel to the front crossbar 25. In yet another embodiment of the present invention, the electromagnetic shielding bar is U-shaped and is mounted directly behind the stadium soccer goal frame 24.

Figure 7:
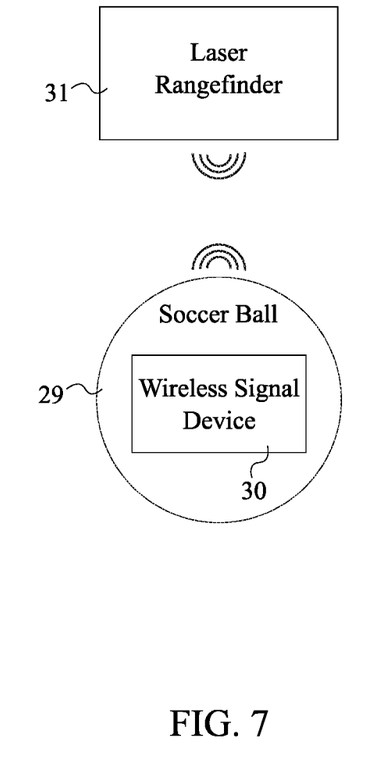
FIG. 7 is an electronic schematic view of the present invention.

Referring to FIG. 7, the laser rangefinder 31 is an optical device that measures distance from the laser rangefinder 31 to a target, in this case the soccer ball 29. The laser rangefinder 31 tracks and measures the distance that the soccer ball 29 is from the stadium soccer goal frame 24. Additionally, the laser rangefinder 31 is used to determine the exact location of the soccer ball 29 on the field. The laser rangefinder 31 is pivotably mounted to the support bar 13 such that the laser rangefinder 31 may rotate and pivot to the location of the soccer ball 29. The present invention tracks the soccer ball 29 through the wireless signal device 30. The wireless signal device 30 is mechanically integrated into the soccer ball 29 and is communicably coupled with the laser rangefinder 31. This allows the present invention to pin point the location of the soccer ball 29 on the field and determine the exact distance of the soccer ball 29 with the laser rangefinder 31, to the stadium goal frame and to the goal line surface. This allows the present invention to accurately determine if the soccer ball 29 passes the goal line surface. If the soccer ball 29 does pass the goal line surface, then a green light signal is sent to officials. In one embodiment of the present invention, the laser rangefinder 31 is integrated into the panoramic camera 46 and is thus slidably mounted to the support bar 13.

Referring to FIG. 2 and FIG. 4, the at least one multimedia bar system 12 comprises a top multimedia bar system 22 and a bottom multimedia bar system 23. The top multimedia bar system 22 provides entertainment at an offset height from the ground. Specifically, the top multimedia bar system 22 is positioned adjacent and parallel the rear crossbar 11. Additionally, the support bar 13 of the top multimedia bar system 22 is adjacently and centrally connected to the rear crossbar 11 as seen in FIG. 2. In this embodiment, the screen 19 of the top multimedia bar system 22 extends downwards towards a bottom end 50 of the first upright post 2 and a bottom end 50 of the second upright post 10.

The bottom multimedia bar system 23 is positioned adjacent to the bottom end 50 of the first upright post 2 and the bottom end 50 of the second upright post 10. There are three main options for mounting the bottom multimedia bar system 23. The first includes mounting the bottom multimedia bar system 23 to the first upright post 2 and the second upright post 10. Specifically, the bottom multimedia bar system 23 is positioned opposite the net 28, across the first upright post 2 and the second upright post 10, essentially behind the first upright post 2 and the second upright post 10. For this, the support bar 13 of the bottom multimedia bar system 23 is oriented perpendicular to the first upright post 2 and the second upright post 10, thus orientating the bottom multimedia bar system 23 parallel to the ground. Additionally, the support bar 13 of the bottom multimedia bar system 23 extends from the first upright post 2 to the second upright post 10. Furthermore, the support bar 13 of the bottom multimedia bar system 23 is mounted offset to the first upright post 2 and the second upright post 10. Resultantly, audible and visual content is emitted close to the ground. In this embodiment, the screen 19 of the bottom multimedia bar system 23 extends upwards towards the top end 49 of the first upright post 2 and the top end 49 of the second upright post 10.

Option two includes mounting the bottom multimedia bar system 23 to the first upright post 2 and the second upright post 10 through a pair of telescoping bars. Specifically, a first telescoping bar and a second telescoping bar are used to allow the bottom multimedia bar system 23 to translate away and towards the first upright post 2 and the second upright post 10 for storage and additional safety prevention. The bottom multimedia bar system 23 is positioned opposite the net 28, across the first upright post 2 and the second upright post 10, essentially behind the first upright post 2 and the second upright post 10. For this, the support bar 13 of the bottom multimedia bar system 23 is oriented perpendicular to the first upright post 2 and the second upright post 10, thus orientating the bottom multimedia bar system 23 parallel to the ground. Additionally, the support bar 13 of the bottom multimedia bar system 23 extends from the first upright post 2 to the second upright post 10. The first telescoping bar is slidably and hingedly mounted along the first upright post 2. Similarly, the second telescoping bar is slidably and hingedly mounted along the second upright post 10. The support bar 13 of the bottom multimedia bar system 23 is perpendicularly and terminally mounted in between the first telescoping bar and the second telescoping bar.

Option three for mounting the bottom multimedia bar system 23 is mounting the bottom multimedia bar system 23 to the net base frame 32. For this, the present invention further comprises a first mounting bar 36, a second mounting bar 37, and a second connecting bar 38; the aforementioned components make up the support structure for the bottom multimedia bar system 23. The first mounting bar 36, the second mounting bar 37, and the second connecting bar 38 are each an elongated structural element designed to support a significant amount of weight and withstand possible external blows from players and the soccer ball 29. The first mounting bar 36 and the second mounting bar 37 are positioned adjacent to the net base frame 32, opposite the stadium soccer goal frame 24. Specifically, the first mounting bar 36 is concentrically and slidably mounted within the first ground tubular bar 33. Similarly, the second mounting bar 37 is concentrically and slidably mounted within the second ground tubular bar 34. The second connecting bar 38 connects the first mounting bar 36 and the second mounting bar 37 in order to support the bottom multimedia bar system 23. Specifically, the second connecting bar 38 is positioned parallel and offset from the first connecting bar 35, opposite the stadium soccer goal frame 24. The second connecting bar 38 is perpendicularly mounted between the first mounting bar 36 and the second mounting bar 37. Resultantly, the first mounting bar 36, the second mounting bar 37, and the second connecting bar 38 outline a U-shape. The support bar 13 of the bottom multimedia bar system 23 is connected parallel and adjacent to the second connecting bar 38. This allows for the bottom multimedia bar system 23 to be translated towards and away from the stadium soccer goal frame 24. In one embodiment of the present invention, the bottom multimedia bar system 23 is divided into two halves. The two halves are mounted on either side of the central support post 41.

Referring to FIG. 2, the present invention further comprises a first corner camera 39 and a second corner camera 40 that are integrated into the bottom multimedia bar system 23. This provides two additional angles for capture gameplay directly in front of the stadium soccer goal frame 24, specifically goals and shots of goal. The first corner camera 39 and the second corner camera 40 are each an optical device capable of recording and capturing graphical images; and, are weather-proof and shock-proof to ensure durability through a variety of weather conditions. The first corner camera 39 is pivotably mounted to the support bar 13 of the bottom multimedia bar system 23. Similarly, the second corner camera 40 is pivotably mounted to the support bar 13 of the bottom multimedia bar system 23. Additionally, the first corner camera 39 is oriented towards the stadium soccer goal frame 24. Similarly, the second corner 40 camera is mounted to the support bar 13 of the bottom multimedia bar system 23. Additionally, the second corner camera 40 is also oriented towards the stadium soccer goal frame 24. Resultantly, the whole stadium soccer goal frame 24 is covered.

In one embodiment of the present invention, the multimedia bar system 12 further comprises a countdown board. The countdown board displays time played, time left in break, added time, and any other time related information regarding to the game. The countdown board is centrally mounted to the support bar 13 and may be oriented in a variety of directions for everyone in the stadium to see. The countdown timer may be implemented through LEDs in one embodiment. In another embodiment, the countdown timer may be implemented as a hologram displayed directly above the rear crossbar 11.

In one embodiment, the present invention further comprises an at least one three-dimensional hologram projector. The three-dimensional hologram projector projects large three-dimensional images and videos directly above and around the stadium soccer goal frame 24, in particular towards the top center of the stadium field. Specifically, the three-dimensional hologram projector is centrally positioned on the front crossbar 25. Additionally, the three-dimensional hologram projector is pivotably mounted to the front crossbar 25 so as to project content at different areas of the field. Type of content that the pivoting three-dimension hologram projector may display includes, but is not limited to, replay of the most recent goal, three dimensional images of sports team and player t-shirt, jersey or sports team logo associated with the most recent scored goal, advertisements, and other similar content above the stadium soccer goal frame 24. A hologram programmer or other administrative staff is in charge of content being displayed by the pivoting three-dimension hologram projector. More specifically, a staff member of each professional sport club is in charge to manage both team's Jersey/T-shirts and ready for projection when a goal is scores. In an alternative embodiment of the present invention, the three-dimensional hologram projector may be mounted in front, in the rear, and or about stadium soccer field goal 24. Specifically, the three-dimensional hologram projector may be mounted behind the front crossbar 25, behind the goal line mark, or behind the goal line surface. In an alternative embodiment of the present invention, the three-dimensional hologram projector is mounted to the rear crossbar 11. In an alternative embodiment, the present invention further comprises a pair of upright hologram projectors; wherein the pair of upright hologram projectors extends upwards from the first goal post 26 and the second goal post 27. The pair of upright hologram projectors project images and videos in between, directly above the front crossbar 25.

The aforementioned display devices of the present invention may be used to display virtual advertising contents directly from television broadcaster networks, live during sport events. This may include sponsor logos, commercials, game play, game replays, sport statistics and so forth.

The present invention also provides a direct content streaming service. For this, the present invention includes an at least one main computing device that is communicably coupled to the retractably underground projector 20, the laser rangefinder 31, the first corner camera 39, the second corner camera 40, the first rangefinder laser-video camera 6, the second rangefinder laser-video camera 42, and the panoramic camera 46. Video and image data are received by the main computing device from the aforementioned components to be streamed to individuals at the game, at home, or any other subscriber. Specifically, content may be streamed to any electronic computing device, wireless or wired, such as a smartphone, a tablet, a desktop, and a laptop to name a few non-limiting examples. It is preferred that content is transmitted to a subscriber through multimedia messaging service technology. Additionally, the present invention may utilize three-dimensional hologram projection and three-dimensional simulation image projection to display information received from the main computing device in the form of a projection from the electronic computing device. For this, images and video content are projected from the screen of the electronic computing device live during gameplay. Statistics, gameplay, advertising, announcements, goal replay, game play, jersey information, player information, and any other content regarding the gameplay may be transmitted to the subscribers. Content streamed to subscribers may be simultaneously timed with the content display components of the present invention for additional effect. The present invention is not limited to other technologies that use any communications service provider, mobile service provider, any software application technologies and wireless connection made for mobile device, such iPhones and tablet PC, wireless connection TV Screen, including through cellular networks and radio frequency design to transmit the same live visual video images, captured from the live scoring goal during the live sport event, are transmitted to mobile devices and TV Screens.

Once the 3D Floating Imaging contents is received it will automatically pop up in mid-air from the mobile device and TV Screens of the mobile app subscribers.

The subscriber' recipient of the mobile application will first receive a visual video images follow with the 3D floating imaging projection announcement that may he review in real time, or in replay.

This technology is not limited to other sports having goalposts on any field play, playing with any ball and objects in outdoor and indoor stadium, arenas, courts, racetrack, track and field, ice field play and water field, not limited to winter sport, summer sport, including live entertainment events.

It is preferred that all the electronic components of the present invention are electronically linked together and controlled from an at least one computing device. This allows an administrative entity to control the visual and audible content being displayed by the present invention.

SUPPLEMENTAL DESCRIPTION

The Cameras mounted to the Multimedia Stadium Soccer Goalpost and Goal Net Display structure are design exclusively to capture live video images from the live scoring goal and the missing goal and actions from the field play, penalty area and goal line surface during a live soccer events, with the same live video images captured from the camera devices during the live sport event(s) are the same video contents that is simultaneously transmitted to mobile devices in real time via live video stream application using Multimedia Messaging service Technology. The 3D hologram projects 3D floating imaging in mid-air above and under the soccer stadium goalpost and the Stadium Goal Net Display that can be seen from any angles and direction around the goalpost, field play and the stadium during live soccer events. With the same 3D Projection imaging contents project it from the 3D Hologram projector device to the official scoring goal or point by announcing and introducing the player name and number and team that has scored the goal or point by projecting their 3D Jersey and 3D Team T-shirt projection, including sponsor logo and adverting, are simultaneously transmitted to mobile devices in real time. The 3D floating imaging content projected in mid-air above the mobile devices in real time to the recipients via their electronic mobile devices such TV Screen a live 3D Projection stream application using Multimedia Messaging Service Technology (MMS). The recipient will receive the same 3D floating imaging in mid-air above their mobile device that it seen and shows from the live stadium and broadcasting sport event and to the TV Screen. The MMS is a sport mobile app that is a soccer and football app offering LIVE scores covering and live scoring goal entertainment projection to sports stadium and design to share that excitement with the sport fan using mobile devices, for professional premier football tournaments and World Cups and championships to millions of soccer fans worldwide. The Live scoring goal is designed to announce the player and team that has scored a goal or point will be introduce and announce by a 3D projection imaging content project the player's jersey, player uniform, Team logo, Sponsor logo, advertising contents during live sport event to be seen by live audience in the stadium and the TV viewer can see in real time. Goal Live Scores is the accurate and most complete soccer and football app to bringing fastest live soccer and football scores and sport breaking news from the actual soccer stadium goalpost and Soccer Goal net Display live scoring video covering and 3D projection straight to your mobile. Both video contents and 3D imaging contents are design for the Live Scoring Goal mobile app to helps sport fans keeping up with all the results and scores from your favorite soccer teams with the live content to be transmitted to mobile device via live video stream application using Multimedia Messaging service Technology. This Goal Live Scores mobile app uses MMS technology and offers new modern methods and advantage address to the sport fans so they can at any time received an up-date of any live professional sport events to receive a full live scoring goal or point action from video clip and 3D projection from the Goalpost to mobile devices simultaneously without having to be a live spectator in the soccer stadium or watching the soccer game on TV Screen and be part of the new digital entertainment value. The camera device and 3D projector device are mounted to the Soccer Stadium Goalpost and soccer goal net display and are designed for scoring goal mobile app, with the purpose capturing live Video Contents of the scoring goal or Point and the 3D Hologram projector to project 3D floating imaging of the team's player's jersey, team logo, company sponsor, adverting, products and services all project in in 3D imaging projection that can be transmit to mobile device during the live sport events and simultaneously transmitted to info in real time to mobile devices using Multimedia Messaging Service Technology, so recipients can view the same live scoring goal video and to see the 3D imaging content that pop up 3D Floating imaging above the mobile device, including TV Screens. This technology is not limited to other sports having goalposts on any field play, playing with any ball and objects in outdoor and indoor stadium, arenas, courts, racetrack, track and field, ice field play and water field, not limited to winter sport, summer sport etc. With this new scoring app technology is use during live professional soccer and sport events and competitions that is broadcast by any sports Television Network Channels, such as the FIFA World Cups and FIFA Confederation Cups and UEFA championship leagues tournaments and the professional premier football leagues matches and tournaments and championships that includes and it's address mostly for PROFESSIONAL SPORT LEAGUES and the Olympic Games, Not limited to other sport such as Handball, Futsal, basketball, American football, Tennis, Ie and Field Hockey, Rugby, Australian football, Cricket, Lacrosse, and polo to name a few non-limiting examples. technology, SMS text message service and video messaging technology.

With the Multimedia soccer Stadium Goalpost and soccer goal net display apparatus having the camera device and the 3D imaging Projector(s) can generate OR collect is own video data using his own Contents via its Own Live Mobile App and transmit its own live scoring goal video clips and the live 3D imaging projection to Mobile Devices, using MMS Technology, that is what makes the invention very unique.

What is claimed is:

1. A multimedia stadium soccer goalpost and goal net display comprising:
   a rear assembly;
   a stadium soccer goal frame;
   a net;
   the rear assembly comprises a first upright post, a second upright post, a rear crossbar, and an at least one multimedia bar system;
   the first upright post and the second upright post being mounted parallel and offset to each other;
   the rear crossbar being positioned adjacent to a top end of the first upright post and a top end of the second upright post;
   the rear crossbar being perpendicularly connected to the first upright post and the second upright post;
   the multimedia bar system being positioned parallel to the rear crossbar;
   the multimedia bar system being mounted offset to the stadium soccer goal frame;
   the stadium soccer goal frame and the rear assembly being mounted offset to each other;
   the net being tethered in between the stadium soccer goal frame and the rear assembly;
   the rear assembly further comprises a central support post, a second rangefinder laser-detector video camera, a second camera track;
   the central support post being positioned parallel and in between the first upright post and the second upright post;
   the central support post being terminally connected to the rear crossbar;
   the second camera track being mounted adjacent and along the central support post;
   the second rangefinder laser-detector video camera being slidably mounted along the second camera track; and the second rangefinder laser-detector video camera being oriented towards the stadium soccer goal frame.

2. The multimedia stadium soccer goalpost and goal net display as claimed in claim 1 further comprising:
the stadium soccer goal frame comprises a front crossbar, a first goal post, and a second goal post;
the first goal post being terminally and perpendicularly connected to the front crossbar;
the second goal post being positioned parallel and opposite to the first goal post, across the front crossbar;
the second goal post being terminally and perpendicularly connected to the front crossbar;
the front crossbar being positioned parallel to the rear crossbar, across the net; and
the net being perimetrically attached to the first goal post, the front crossbar, and the second goal post.

3. The multimedia stadium soccer goalpost and goal net display as claimed in claim 1 further comprising:
the multimedia bar system comprises a support bar, a plurality of lights, and a plurality of first speakers;
the support bar being oriented parallel to the rear crossbar;
the support bar being mounted offset to the stadium soccer goal frame;
the plurality of lights being distributed along the support bar;
each of the plurality of lights being adjacently connected to the support bar;
the plurality of first speakers being distributed along the support bar;
each of the plurality of first speakers being adjacently connected to the support bar; and
each of the plurality of first speakers and each of the plurality of lights being oriented towards the stadium soccer goal frame.

4. The multimedia stadium soccer goalpost and goal net display as claimed in claim 1 further comprising:
the at least one multimedia bar system comprises a top multimedia bar system;
the top multimedia bar system being positioned adjacent and parallel to the rear crossbar; and
a support bar of the top multimedia bar system being adjacently and centrally connected to the rear crossbar.

5. The multimedia stadium soccer goalpost and goal net display as claimed in claim 1 further comprising:
the at least one multimedia bar system comprises a bottom multimedia bar system;
the bottom multimedia bar system being positioned adjacent to a bottom end of the first upright post and a bottom end of the second upright post;
the bottom multimedia bar system being positioned opposite to the net, across the first upright post and the second upright post;
a support bar of the bottom multimedia bar system being oriented perpendicular to the first upright post and the second upright post;
the support bar of the bottom multimedia bar system extending from the first upright post to the second upright post; and
the support bar of the bottom multimedia bar system being mounted offset to the first upright post and the second upright post.

6. The multimedia stadium soccer goalpost and goal net display as claimed in claim 3 further comprising:
the multimedia bar system further comprises a plurality of sponsor display panels;
the plurality of sponsor display panels being distributed along the support bar; and
each of the plurality of sponsor display panels being adjacently connected to the support bar.

7. The multimedia stadium soccer goalpost and goal net display as claimed in claim 3 further comprising:
the multimedia bar system further comprises a retractable screen assembly and an at least one retractable underground projector;
the retractable screen assembly comprises a motorized housing and a screen;
the retractable screen assembly being positioned in between the first upright post and the second upright post;
the motorized housing being mounted parallel to the support bar;
the screen being mechanically integrated into the motorized housing;
the retractable underground projector being positioned in between the first upright post and the second upright post;
the retractable underground projector device being mounted offset to the stadium soccer goal frame; and
the retractable underground projector device being oriented towards the screen.

8. The multimedia stadium soccer goalpost and goal net display as claimed in claim 3 further comprising:
the multimedia bar system further comprises an at least one pivoting projector device; and
the pivoting projector device being centrally and externally mounted to the rear crossbar.

9. The multimedia stadium soccer goalpost and goal net display as claimed in claim 3 further comprising:
a soccer ball;
a wireless signal device;
the multimedia bar system further comprises a laser rangefinder;
the laser rangefinder being pivotably mounted to the support bar;
the wireless signal device being mechanically integrated into the soccer ball; and
the laser rangefinder being communicably coupled with the wireless signal device.

10. The multimedia stadium soccer goalpost and goal net display as claimed in claim 1 further comprising:
a net base frame;
the net base frame comprises a first ground tubular bar, a second ground tubular bar, and a first connecting bar;
the net base frame being positioned in between the stadium soccer goal frame and the rear assembly;
the first ground tubular bar and the second ground tubular bar being positioned parallel and offset to each other;
the first ground tubular bar being terminally and hingedly connected to the first goal post, opposite the front crossbar;
the second ground tubular bar being terminally and hingedly connected to the second goal post, opposite the front crossbar;
the first connecting bar being perpendicularly connected in between the first ground tubular bar and the second ground tubular bar; and
the net being perimetrically attached to the first ground tubular bar, the second ground tubular bar, and the first connecting bar.

11. The multimedia stadium soccer goalpost and goal net display as claimed in claim 10 further comprising:
a first mounting bar;
a second mounting bar;
a second connecting bar;

the at least one multimedia bar system comprises a bottom multimedia bar system;

the first mounting bar and the second mounting bar being positioned adjacent to the net base frame, opposite the stadium soccer goal frame;

the first mounting bar being concentrically and slidably mounted within the first ground tubular bar;

the second mounting bar being concentrically and slidably mounted within the second ground tubular bar;

the second connecting bar being positioned parallel and offset from the first connecting bar, opposite the stadium soccer goal frame;

the second connecting bar being perpendicularly mounted between the first mounting bar and the second mounting bar; and a support bar of the bottom multimedia system being connected parallel and adjacent to the second connecting bar.

12. The multimedia stadium soccer goalpost and goal net display as claimed in claim 11 further comprising:

a first corner camera;

a second corner camera;

the first corner camera being pivotably mounted to the support bar of the bottom multimedia bar system;

the first corner camera being oriented towards the stadium soccer goal frame;

the second corner camera being pivotably mounted to the support bar of the bottom multimedia bar system; and the second corner camera being oriented towards the stadium soccer goal frame.

13. The multimedia stadium soccer goalpost and goal net display as claimed in claim 1 further comprising:

the first upright post and the second upright post each further comprises a tubular body, a plurality of advertisement panels, a first camera track, a first rangefinder laser-detector video camera, a plurality of light-emitting diode (LED) strips, an at least one second speaker, and a solar platform base;

the plurality of advertisement panels being radially distributed about the tubular body;

each of the plurality of advertisement panels being mounted along the tubular body;

the first camera track being positioned parallel and offset to the tubular body;

the first camera track being mounted along the tubular body;

the first rangefinder laser-detector video camera being slidably mounted to and along the first camera track;

the first rangefinder laser-detector video camera being oriented towards the stadium soccer goal frame;

the plurality of LED strips being radially distributed about the tubular body;

each of the plurality of LED strips being mounted along the tubular body;

the second speaker being terminally positioned to the plurality of advertisement panels;

the second speaker being mounted about the tubular body;

the solar platform base being positioned opposite the second speaker, across the plurality of advertisement panels; and the solar platform base being mounted about the tubular body.

14. The multimedia stadium soccer goalpost and goal net display as claimed in claim 1 further comprising:

a plurality of cable pulleys;

an at least one elastic cord;

the plurality of cable pulleys being distributed along the rear crossbar;

each of the plurality of cable pulleys being adjacently and rotatably mounted to the rear crossbar; and the elastic cord being tethered in between the plurality of cable pulleys and the net.

15. The multimedia stadium soccer goalpost and goal net display as claimed in claim 1 further comprising:

a panoramic camera;

a third camera track;

the third camera track being centrally positioned to the rear crossbar;

the third camera track being mounted adjacent and along the rear crossbar;

the panoramic camera being slidably mounted along the third camera track; and the panoramic camera being oriented towards the stadium soccer goal frame.

16. The multimedia stadium soccer goalpost and goal net display as claimed in claim 1 further comprising:

a plurality of programmable light-emitting diodes (LEDs);

the plurality of programmable LEDs being distributed about the net; and each of the plurality of programmable LEDs being mechanically integrated into the net.

17. The multimedia stadium soccer goalpost and goal net display as claimed in claim 1 further comprising: the rear assembly further comprises a central support post and an at least one three-dimensional LED fan projector; the central support post being positioned parallel and in between the first upright post and the second upright post; the central support post being terminally connected to the rear crossbar; the three-dimensional LED fan projector being positioned in between the central support post and the net; the three-dimensional LED fan projector being mounted to the central support post.

18. The multimedia stadium soccer goalpost and goal net display as claimed in claim 1 further comprising:

an at least one retracting reel cord;

a plurality of retracting reel cord housings;

the plurality of retracting reel cord housings being distributed along the rear crossbar;

each of the plurality of retracting reel cord housings being adjacently and rotatably mounted to the rear crossbar; and the retracting reel cord being tethered in between the plurality of retracting reel cord housings and the net.

* * * * *